Sept. 10, 1957  C. M. WOODRUFF  2,806,202
VERTICAL MAGNETOMETER CIRCUIT
Filed April 13, 1948  3 Sheets-Sheet 3
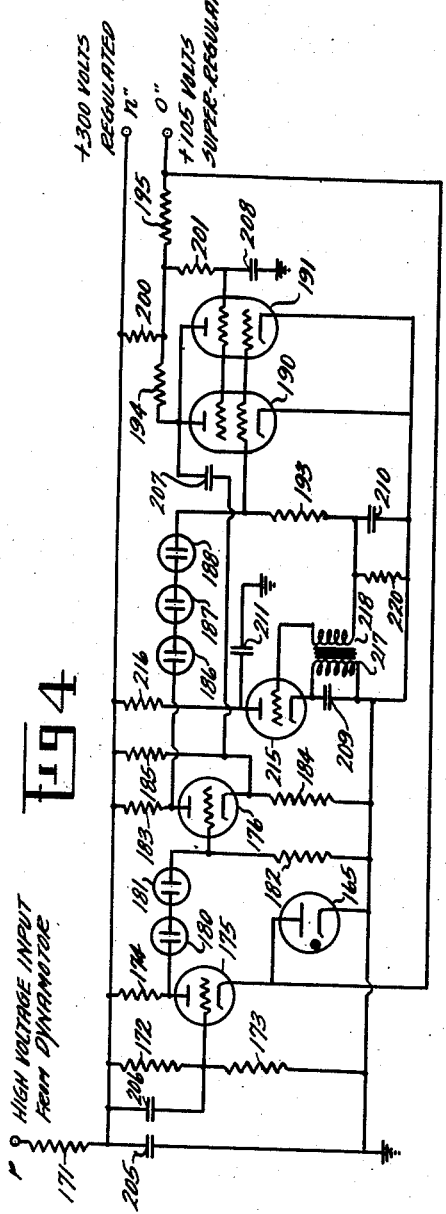
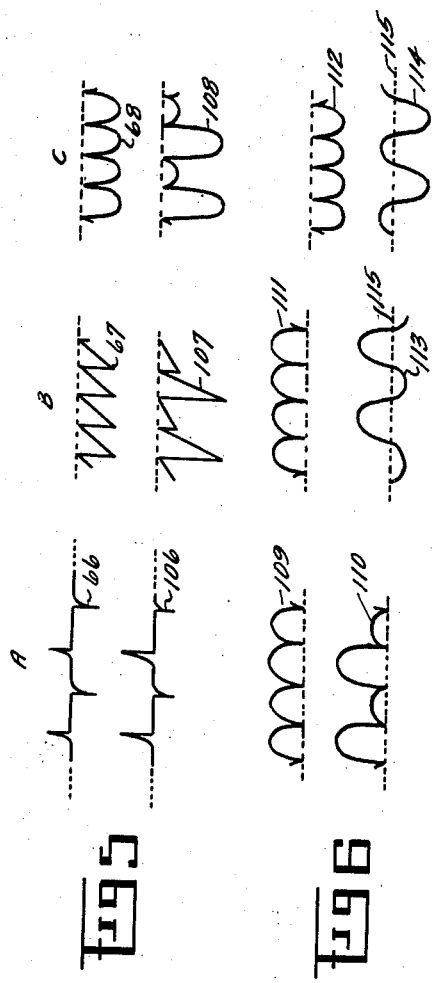
INVENTOR.
CLARENCE M. WOODRUFF
BY Wade Koontz
Orlando L. Moody
ATTORNEYS

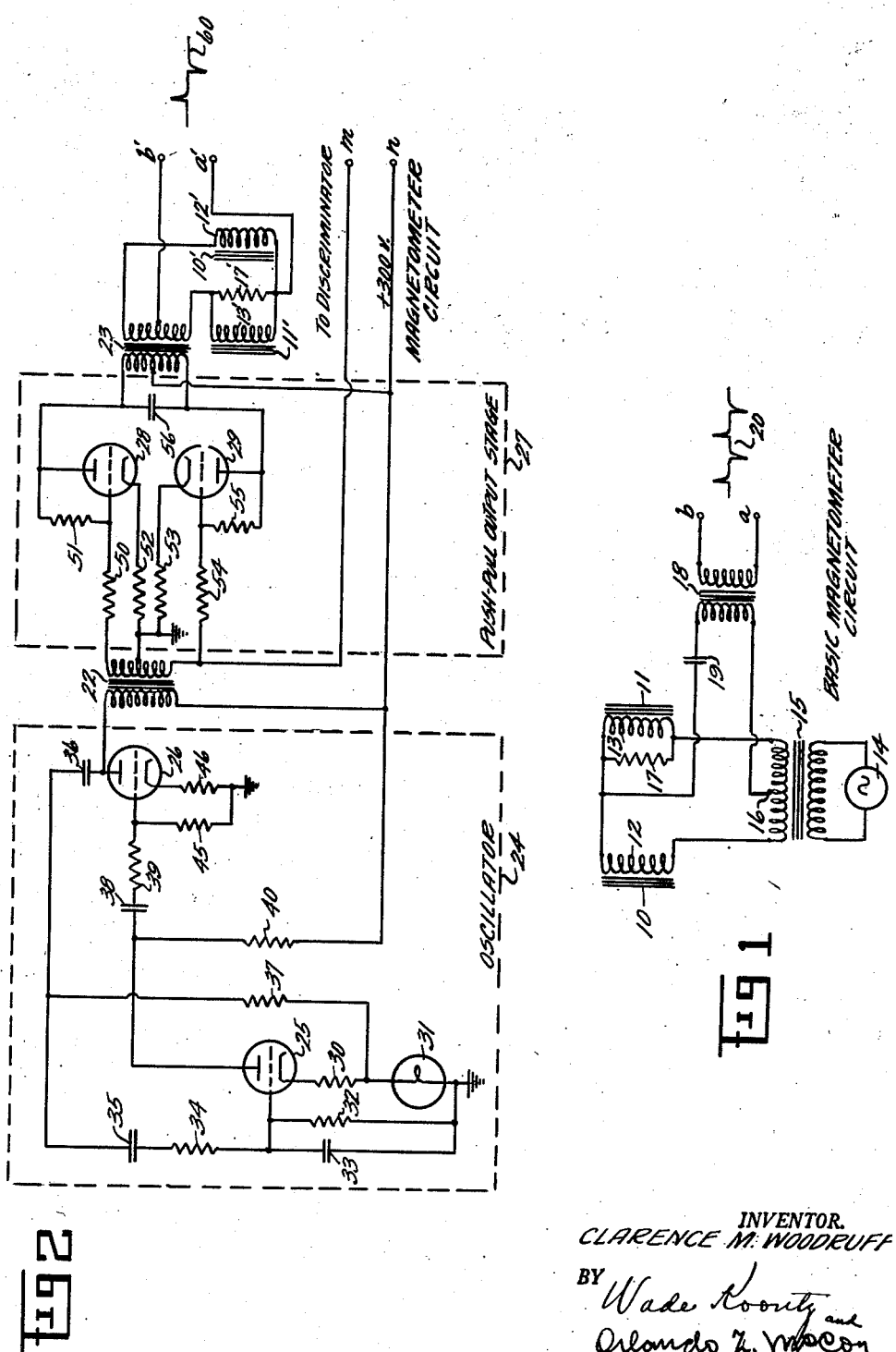

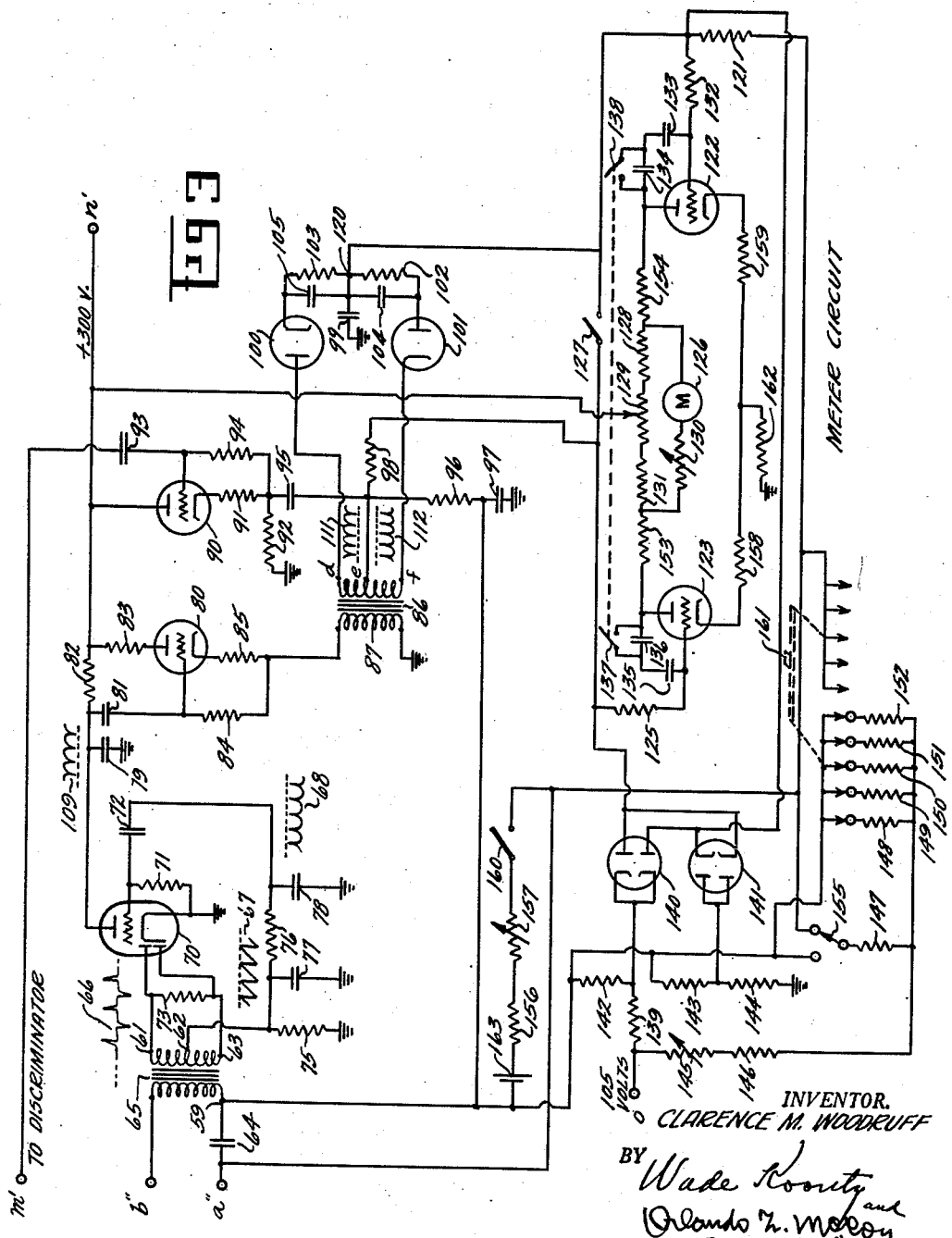

United States Patent Office 2,806,202
Patented Sept. 10, 1957

2,806,202

VERTICAL MAGNETOMETER CIRCUIT

Clarence Merrill Woodruff, Columbia, Mo.

Application April 13, 1948, Serial No. 22,019

10 Claims. (Cl. 324—43)

(Granted under Title 35, U. S. Code (1952), sec. 266)

The invention described herein may be manufactured and used by or for the Government for governmental purposes without payment to me of any royalty thereon.

This invention concerns magnetometers for use in electronics work and more particularly to a vertical magnetometer circuit for measuring the vertical intensity of the world's magnetic field from an airplane in flight.

In the past some work has been done in seeking intensity determinations of the earth's magnetic field and the present disclosure is directed toward this same objective. The present invention is primarily directed toward providing an improved vertical magnetometer that is designed for measuring the vertical intensity of the magnetic field of the earth.

An object of the present invention is to provide an improved vertical magnetometer circuit, the output of which is converted into meter readings that indicate the absolute value of the earth's magnetic field.

Another object is to provide a means and method for measuring the earth's vertical magnetic field intensity in terms of polarity and the relative amplitude of wave forms indicating the magnitude of the field intensity.

Another object is to provide a vertical magnetometer for use in navigation, and particularly for guiding seagoing vessels, airplanes in flight, and the like, or for use in the guiding of armed airborne missiles to a target up to 3,000 miles away.

With the above and other objects in view which will be apparent from the following description, an illustrative embodiment of the present invention is shown in the accompanying drawings wherein:

Fig. 1 is a fragmentary circuit diagram of a saturable reactor-bridge magnetometer circuit that augments the present invention;

Fig. 2 is a fragmentary diagrammatic magnetometer circuit that augments the present invention;

Fig. 3 is a circuit diagram designed to convert the amplitude of the magnetometer pulses, as output of magnetometer circuits in Figs. 1 or 2, into a direct reading of the strength of the magnetic field passing through the magnetometer;

Fig. 4 is a circuit diagram of a regulated power supply for use with the magnetometer circuit shown herein;

Figs. 5 and 6 show typical wave forms.

A fragmentary basic magnetometer circuit that augments the present invention is shown in Fig. 1 of the accompanying drawings. The basic magnetometer circuit there shown comprises two long narrow Permalloy core strips 10 and 11 individually surrounded by separate inductance magnetometer coils 12 and 13, respectively, for decreasing the reluctance or increasing the amplitude of the magnetic flux of the magnetometer coils 12 and 13. The coils 12 and 13 are legs in a bridge circuit, to which an alternating voltage at a frequency of, for example, 400 cycles per second is supplied from a generator 14 through a coupling transformer 15.

The alternating voltage induced from the primary winding of the transformer 15 into the secondary winding that is tapped at contact 16, drives the inductance cores 10 and 11 to saturation in either direction. A resistor 17, that is connected across the inductance coil 13, shifts the phase of the induced voltage to produce alternate positive and negative pulses at the output terminals a and b from a transformer 18. A capacitor 19 is disposed between a terminal of the primary winding of the transformer 18 and the junction of the inductance coils 12 and 13. The pulses from the transformer 18 are of equal amplitude if zero flux passes through the Permalloy core strips 10 and 11. The wave form 20 is the resultant pulsed output from the transformer 18. The Permalloy core strips 10 and 11 are mounted parallel to each other.

The inductance coils 12 and 13 may be omitted and connections made directly to the Permalloy core strips 10 and 11 if preferred, within the scope of the present invention. The electric pulses then passing through the strips 10 and 11, will determine the direction of charge on the strips, depending upon the direction in which the flux passes through the strips 10 and 11.

Operatively the magnetometer inductor coils 12 and 13 are saturable reactors which are energized by the passing of a sine wave through the transformer 15. One of the inductors 13 is shunted by the resistor 17 which shifts the voltage wave form so that the output from the bridge, consisting of the inductors or reactors 12 and 13 as two legs and the two arms of the center tapped driving transformer 15 as the other two legs, appear across the transformer 18, as shown in the wave form 20. The earth's magnetic field permeating the core strips 10 and 11 in the inductance magnetometer coils 12 and 13, influences the magnitude of the polarity thereof as evidenced by alterations in the shape of the wave form 20, as developed more extensively hereinafter.

A more detailed magnetometer circuit that augments the present invention is shown in Fig. 2 of the drawings, wherein components corresponding with those in Fig. 1 bear the same numerals primed. The circuit shown in Fig. 2 comprises an oscillator 24 and a push-pull output stage 27. The oscillator 24 is a tuned resistance-capacitance oscillator of the Wien-bridge type and, as shown in Fig. 2, comprises an oscillator tube 25 and an amplifier and converter tube 26, with associated elements and components. The oscillator 24 drives, and is coupled through a transformer 22 with the push-pull output stage 27 comprising the tubes 28 and 29 connected in circuit as shown. An output of 400 cycles per second through transformer 23 and at the terminals $a'$ and $b'$, energizes the magnetometer Permalloy strips 10' and 11' in the magnetometer coils 12' and 13', with a stabilized voltage that remains essentially constant toward changes in the supply voltage of plus or minus 100 volts above the normal of plus 300 volts, as indicated at terminals $n$ and $n'$ in Figs. 2 and 3, respectively. An additional voltage is taken from the transformer 22 as indicated, to feed a discriminator circuit shown in Fig. 3 through contacts $m$ and $m'$ in Figs. 2 and 3, respectively.

The plus 300 volts contact $n$ is connected directly to the plate of the oscillator tube 25 and, through the oscillator winding of the transformer 22 to the plate of the amplifier and converter tube 26. The plate of the tube 25 is connected through capacitor 38 and resistor 39 to the grid of tube 26. The grid of the tube 26 is grounded through a resistor 45 and the cathode is grounded through a resistor 46. The plate of the tube 26 is connected through capacitors 35 and 36 and resistor 34 to the grid of the tube 25. The grid of the tube 25 is applied to ground through a capacitor 33 and resistor 32 connected in parallel. The cathode of the tube 25 is applied to ground through a resistor 30 in series with a lamp 31.

A resistor 37 connects the junction of the capacitors 35 and 36 with the junction of the resistor 30 and lamp 31.

The plus 300 volts contact $n$ is connected to the midpoint of the push-pull output stage winding of the transformer 23 that is shunted by a capacitor 56 and is connected to the plates of the tubes 28 and 29. The grids of the tubes 28 and 29 are connected to the plates thereof through resistors 51 and 55, respectively, and, through resistors 50 and 54 across the push-pull output stage of the transformer 22. The cathodes of the tubes 28 and 29 are connected through resistors 52 and 53, respectively, to the midpoint of the push-pull output stage winding of the transformer 22 and to ground.

The transformer 23 has a secondary winding that is center tapped to provide the magnetometer circuit contact $b'$ and that is connected in shunt with the magnetometer coils 12' and 13' in series with the magnetometer circuit contact $a'$ at their junction. The coil 13' is shunted by a resistor 17'. The coils 12' and 13' surround Permalloy core strips 10' and 11', respectively, that decrease the reluctance or increase the amplitude of the magnetic flux in the magnetometer coils 12' and 13'. A normal wave form 60 for zero flux is supplied across contacts $a'$, $b'$. The normal wave form 60 is modified as described hereinafter, depending upon the magnitude and polarity of a magnetic field into which the magnetometer coils 12' and 13' may be positioned, such as that of the earth for example.

The circuits shown in Figs. 3 and 4 of the drawings convert the amplitude of the magnetometer pulses, indicated as 20 and 60 in Figs. 1 and 2, respectively, into direct meter readings indicating the relative strengths of the magnetic fields, such as that of the earth, that pass through the magnetometer.

The circuit shown in Fig. 3 of the drawings converts differences in pulse amplitudes into readings on a meter 126 that provides a directly indicated measure of the magnitudes of magnetic fluxes that pass through the magnetometer. Alternate positive and negative pulses that appear across the pairs of magnetometer bridge terminals $ab$ and $a'b'$ shown in Figs. 1 and 2, respectively, are fed through contacts $a''$ and $b''$ in Fig. 3, into a transformer 65 which, in conjunction with diode elements of a duplex diode triode tube 70 shunted by a resistor 73 provide full wave rectification of the pulses. The tube 70 is of the types V103 or 6SQ7.

The resistor 73 connected across the output of the transformer 65, damps the oscillations of the transformer that are set up by the excitation of the pulses. Resistors 75 and 76 with capacitors 77 and 78 are wave shaping elements that convert the pulses into smooth wave forms, such as are shown as the wave forms 66 from transformer 65, 67 from terminal 62, and 68 across capacitor 78. The dash lines shown with the wave forms indicate ground. The wave form 66 represents a wave shape between the terminals 61 and 63 of the transformer 65 with zero flux passing through the magnetometer. The wave form 67 is the wave shape between terminal 62 and ground with the angle theta equal to zero. The angle theta is an angle measuring time or phase and, in this instance, time is equal is zero.

The wave form 68 is the wave shape across the capacitor 78 with theta equal to zero. As seen by the wave shapes shown, the full wave rectification of wave form 66 of the pulses by the diode elements of the tube 70 produces a negative type of saw tooth wave shown in wave form 67 across the capacitor 77 which is smoothed somewhat by the resistor 76 and the capacitor 78 to produce a series of negative loops shown in wave form 68 having a frequency that is double that of the fundamental of 400 cycles per second.

These wave forms assume different shapes when flux passes through the magnetometer, as indicating respectively by the comparable waves 106, 107 and 108 shown in Fig. 5. The wave forms 106, 107 and 108 are comparable to the wave forms 66, 67 and 68, respectively, described above but modified with the flux passing through the magnetometer. Flux passing through the magnetometer manifests itself in the form of amplified polarity magnitude as indicated particularly in wave form 106 as compared with its counterpart wave form 66. The same tendency is indicated by amplified alternate saw teeth and loops in the flux present rectified wave forms 107 and 108, from the no flux rectified wave forms 67 and 68, respectively throughout, shown in Fig. 5. In the wave forms 107 and 108 the amplification of the magnitude of one polarity, due to the presence of the earth's magnetic field, or other magnetic field for that matter, was accomplished on the wave form 67 or 68 prior to its rectification.

The wave form 108 beneath the wave form 68 is passed through a coupling condenser 72 to the grid of the tube 70 where it is amplified and then inverted and the wave shape is further improved by capacitor 79 to give a more symmetrical wave form 109. The wave form 109 across the capacitor 79 is as shown thereabove and in Fig. 6, as wave form 109 zero flux and as wave form 110 in the presence of flux.

The resistor 82 is the load resistor for the tube 70 with plate current of plus 300 volts supplied from contact $n'$. The wave form 109 shown in Figs. 3 and 6, is fed through a coupling capacitor 81 to the grid of tube 80. The cathode of the tube 80 is biased by a resistor 85. The output of the tube 80 is stabilized by a resistor 83, the resistance to which is large with respect to the resistance of the plate of tube 80. The voltage wave is applied to the junction of the resistors 84 and 85 with the ungrounded terminal of the winding 87 of the transformer 86 with the tube 80 acting as a cathode follower. The output of the transformer 86 is fed to the plate and the cathode of two elements of a duo-diode shown as the tubes 100 and 101. The wave forms between the terminals $d$ and $e$, and $e$ and $f$ of the transformer 86 are shown in Figs. 3 and 6 as the wave forms 111 and 112, respectively, for the condition of zero flux, with the dash line indicating ground.

The center tap terminal $e$ of the transformer 86 also is energized by the 400 cycles per second fundamental sine wave passing through the cathode follower tube 90 and the coupling capacitor 95. The grid of the tube 90 is coupled through the capacitor 93 with the push-pull output stage winding of the transformer 22 and is connected through the resistor 54 with the grid of the tube 29. The grid of the tube 90 is applied to ground through the resistors 94 and 92. The cathode of the tube 90 is applied to ground through the resistors 91 and 92. The phase relation is such that the peaks and valleys of the 400 cycle wave combine with the loops of the 800 cycle half waves 111 and 112 shown in Fig. 6 to give the wave forms 113 and 114, respectively, shown in Fig. 6, with ground indicated by the dash line 115.

With zero flux through the magnetometer, the positive going loops of the wave form 111 between terminal $d$ of the transformer 86 and ground are equal to the negative loops of the wave form 112 between tap $f$ and ground. These loops cause current to flow through the double diode tube shown as the tubes 100 and 101, thereby charging the capacitor 105 with a positive voltage and a capacitor 104 with a negative voltage. There is a resultant current which flows from terminal $d$ of the transformer 86 through the tube 100, through resistors 103 and 102, and through tube 101 to the terminal $f$ of the transformer 86, and through the transformer winding back to the terminal $d$ thereof. The capacitor 99 is large with respect to the capacitors 105 and 104 so that a more steady current will flow through resistors 103 and 102.

When a flux passes through the magnetometer the amplitude of the positive loops applied to the tube 100 will not equal the amplitude of the negative loops applied to the tube 101 and more current will pass through one of the elements than will pass through the other. The currents through the resistors 103 and 102 also no longer will be equal. As a result, current must enter or leave the circuit at point 120 between the resistors 102 and 103. The current must also be balanced by an equal current entering or leaving the system at the terminal e of the transformer 86. Current leaving the system at the point 120 passes through the resistor 121 causing a rise in potential which is applied through resistor 132 to the grid of the tube 122. This current continues around the circuit from the resistor 121 to point a" of the input where it is blocked by the capacitor 64 from the terminal 59 of the transformer 65 so that it must pass through the magnetometer coils 12 and 13 in Fig. 1 and 12' and 13' in Fig. 2, in such a direction as to oppose the change in flux which produced the unbalanced wave form that generated the current. This negative feed back stabilizes the magnetometer so that it has a more linear change and pulse amplitude with respect to change in flux passing through it and this extends the range over which the system will operate.

The current passing through the magnetometer returns at point b" and thence through the primary winding of the transformer 65 to the junction of the resistor 96 and capacitor 97 applied to ground. In passing through the resistor 96 the potential drops so that the potential of terminal e of the transformer 86 decreases in an amount that is equal to the rise in potential at the point 120 at the junction of the resistors 102 and 103. This decrease in potential passes through the resistor 98 to the resistor 125 and thence to the grid of the tube 123.

To summarize, external currents that are generated by an unbalance wave form applied to the duo-diode tube represented by the tubes 100 and 101 and passing through the resistors 71 and 121, cause a potential charge, and cause a potential of one grid of a duo-triode, or the tubes 122 and 123, to rise and the other grid to fall, and then actuates a meter 126 also indicated by the letter M. The meter 126 is calibrated to read directly the change in magnetic field strength affecting the magnetometer.

Switch 127 provides a means of connecting the grids of the duo-triode tube indicated by the tubes 122 and 123, in order that the meter 126 will read zero at the center of the scale when the variable resistor 129 is properly adjusted. The variable tap on the resistor 129 has plus 300 volts applied to it as plate current through resistors 128 and 154 to tube 122 and through resistors 131 and 153 to tube 123. The meter 126 in series with a variable resistor 130 shunts the resistors 131, 128 and 129. The resistor 98 is inserted in the circuit so that when the switch 127 is closed, the 400 cycle voltage output of the tube 90 will not be grounded through the capacitor 99. The capacitor 97 is used to remove the 400 cycle voltage from the direct current path through the transformer 65 and hence through the magnetometer.

In the grid circuits of the tubes 122 and 123, the resistors 132 and 125 in conjunction with the capacitors 133, 134, 135 and 136 form a filter system which prevents the meter 126 from responding to rapid changes from either voltage or flux. Ganged switches 137 and 138 across the capacitors 136 and 134, respectively, are provided so that capacitance between the plates and the grids of the tubes 122 and 123 may be changed to give either a fast or a slow response. The slow response is used to filter out periodic changes in magnetic flux that are produced by the swinging of the magnetometer which may be stabilized with a pendulum, not shown, in usual manner if preferred. The variable resistor 130 in the circuit of the meter 126, is used to calibrate the meter so that a change of 500 gammas in magnetic field strength will produce a full scale deflection of a 50 microammeter meter. The cathodes of the tubes 122 and 123 are joined through the resistors 158 and 159 connected in series. The junction of the resistors 158 and 159 is applied to ground through a resistor 162. The tubes 140 and 141 are diodes that are biased beyond cut off by the current flowing through the resistors 142 and 143. These diodes 140 and 141 are voltage limiting diodes which prevent the voltage applied to the grids of the tubes 122 and 123 from exceeding full scale deflection of the meter 126. This feature is incorporated so that the condensers of the time delay system will not charge up beyond the limits of the meter when a sudden swing of the pendulum occurs, thus extending the recovery time of the system following an excessive maneuver of the airplane in which the system is used. The full scale range of the instrument as described is a change in flux of plus or minus 500 gammas or a total of 1000 gammas.

This range has been extended to a total of 11,000 gammas by passing a known regulated current through the magnetometer in such a way as to oppose the external flux passing through it. This current arriving at contact P in Fig. 4 from a regulated and compensated voltage of 105 volts and applied at contact O in Fig. 3 through a resistor 139 to the pair of cathodes of the tube 140, is adjusted in magnitude by a variable resistor 145 in series with a resistor 146. Resistors 147 to 152, inclusive, are precision resistors which, when the variable resistor 145 is properly adjusted, permits switching current of known amounts through the magnetometer circuits. The resistor 147 is over 200,000 ohms and feeds current to a switch 155. When the switch 155 is in the right hand position it passes sufficient current through the magnetometer to oppose a flux of 5,000 gammas. If switched to the left position, the current flows through the resistors 143 and 144 to ground without passing through the magnetometer, thus the total current passing through the resistor 147 is the same regardless of the setting of the switch 155.

Resistors 148 to 152, inclusive, are each a one megohm precision resistor which also may be used to change the current through the magnetometer by 1000 gamma steps. The resistors 142 and 144 provide a potential divider which biases the vacuum tube voltmeter comprising the tubes 122 and 123 at approximately 45 volts.

A 1½ volt battery 163 in series with a fixed resistor 156, a variable resistor 157 and a switch 160 permits the injection of a small current through the magnetometer so that the meter 126 will read full scale to the left. If the variable resistor 145 is properly adjusted with the meter reading to the left, one step of switch 161 should cause the meter to read full scale to the right. Switch 160 is used only when adjusting the variable resistor 145. This adjustment is required to compensate for failure of the tube 165 of the regulated voltage supply in Fig. 4 to augment and to hold exactly the same voltage when the set is turned on. The tube 165 may be of the type VR105.

In order to operate in fields in excess of 11,000 gammas, which is the range of this instrument, a first value of the magnetic field is neutralized by a permanent magnet, not shown, that is positioned near the magnetometer element. Experimentally a permanent magnet was placed in the end of the pendulum directly beneath the magnetometer element and was adjusted to neutralized 50,000 gammas of the earth's magnetic field, leaving approximately 8,500 gammas to be measured by the instrument.

In the use of the disclosed instrument for the navigation of an airplane along a line of constant vertical magnetic intensity, the current through the magnetometer introduced by the range switches 161 and 155 and the resistors 147 to 152, inclusive, may be eliminated using only a permanent magnet mounted in the pendulum to neutralize the vertical magnetic intensity of the line which is to be followed.

A regulated power supply circuit is shown in Fig. 4 of the drawings. The circuit there shown provides a direct coupled amplifier of three stages through the use of a plurality of neon bulbs and a negative bias generator, connected in circuit as shown. The regulated power supply circuit shown in Fig. 4 supplies 300 volts stabilized to an accuracy of plus or minus 1½ volts over a range of from 30 milliamperes to 120 milliamperes current drain through the regulators. In addition, the regulator supplies approximately 105 volts that is compensated so that the output remains constant as the input voltage is varied to produce a current drain of from 30 to 120 milliamperes through the regulator.

In the means for regulating the power supply shown in Fig. 4, the unregulated power supply at contact P is connected to resistor 171 which is a potential dropping resistor by which the input voltage is dropped to 300 volts. The regulator circuit maintains the current through this resistor 171 at such a value that the output voltage remains substantially constant as the input voltage is varied. The resistance of the resistor 171 is chosen in terms of the magnitude of supply voltage and of the range over which the voltage is expected to vary. Resistors 172 and 173 serve as a potential or voltage divider which steps the 300 volts down to approximately 105 volts, which is the cathode potential of a duo-triode tube shown as the tubes 175 and 176 and which is fixed by the tube 165 and appears at the contact O″.

In practice, the resistor 173 is to be varied slightly from the value indicated in order to provide a 300 volt output at contact n″ for the various VR105 type of tube 165 that may be used. The resistor 173 is to be adjusted to be adapted for service with a VR105 tube 165 with which it is used. After having been once selected, an increase of the potential across the resistors 172 and 173 will increase the potential as applied to the grid of the tube 175. As a result, the increased current that passes through the resistor 174 will lower the potential of the grid of the tube 176 which is connected to the plate of the tube 175 through two neon bulbs 180 and 181 which step the voltage of the plates of the tube 175 down from about 200 volts to 60 or 70 volts. A resistor 182 is used to maintain the current through the neon bulbs 180 and 181.

A lower potential of the grid of the tube 176 causes that tube to draw less current so that the plate potential that is supplied to the resistor 183 rises. The resistors 184 and 185 form a potential divider that maintains the cathode of the tube 176 at a suitable operating potential without sacrificing too much gain for that particular stage. A rise in plate potential of the tube 176 is transferred to the grids of the tubes 190 and 191 through three neon bulbs 186, 187 and 188 which drop the plate potential down from between 180 and 210 volts to between 0 and −30 volts, which is the operating range of the grid potential of the tubes 190 and 191, which are connected in parallel. A tube 215 is a negative biased generator which supplies a negative potential that is sufficient to maintain a current through the three neon bulbs 186, 187 and 188 when the potential of the grids of the tubes 190 and 191 varies between 0 and −30 volts.

The rise in grid potential of the tubes 190 and 191 produce an increased flow of plate current. This increased flow of plate current flows through the resistor 171 and prevents the voltage across the resistors 172 and 173 from rising more than a very small amount. The plate resistor 194, that is of 2000 ohms resistance, and a screen grid resistor 201 of 10,000 ohms resistance enable the tubes 190 and 191 to pass larger currents without exceeding the dissipation ratings of the tube. A resistor 200 of 30 ohms is a compensating resistor which uses the current through the tubes 190 and 191 to reduce the voltage rise of the 300 volt line so that the output voltage to a resistor 195 is not changed. The resistor 195 provides a current that is required to keep the tube 165 in a conducting state. The resistor 195 is so chosen that from 15 to 16 milliamperes of current flow through the tube 165, thus maintaining a glow discharge over the whole cathode of the tube. The voltage output from the tube 165 thus is maintained constant to a high degree providing the tube 165 has been aged by from 8 to 10 hours of operation.

Condensers 205 to 208, inclusive, are added to reduce parasitic oscillations and to correct phase shift to prevent oscillations at high frequency. An oscillating circuit in the cathode circuit of the negative bias generator tube 215 and consisting of an inductive winding 217 and a capacitor 209 is coupled to an inductance 218 which energizes the grid in phase with the cathode of the tube 215. The inductive windings 217 and 218 comprise a transformer in the grid-cathode circuit of the tube 215. The step up ratio of the transformer windings 217 and 218 supplies the gain that is necessary to produce oscillations. Grid current from and through the resistor 220 supplies a negative bias while the capacitor 210 removes the 400 kilocycle component of the oscillator. The resistor 216 reduces the plate voltage of the tube 215 so that an output voltage of between 60 and 70 volts is possible with less than two milliamperes of plate current. The capacitor 211 bypasses the kilocycle current to ground.

It is to be understood that the vertical magnetometer circuits that are shown and described herein have been submitted for the purposes of illustrating and describing an operatable embodiment of the present invention and that modifications, substitutions and limited rearrangements may be made therein without departing from the scope of the present invention.

I claim as my invention:

1. A circuit for use with an alternating current-fed vertical magnetometer having a pair of cored windings for disposition within a magnetic field and having an output inclusive of a meter circuit converting differences in the amplitude of magnetometer pulses into pulsed energy indicative of the strength of the magnetic field within which the magnetometer cored windings are disposed, comprising a transformer to which the pulsed output from the magnetometer is applied, full wave rectification means in said meter circuit and to which the pulsed transformer output is applied, resistor means damping the transformer oscillations set up by the pulse excitation, a plurality of wave shaping elements converting the pulsed electrical energy from said transformer into smooth wave forms of a single polarity and of double the fundamental frequency of the pulsed output from the magnetometer and of variable shapes and amplitudes when flux passes through the magnetometer due to the change in its magnetic field, tube means amplifying and inverting the wave shape supplied thereto from said wave shaping elements, wave symmetry improving capacitor means in the output from the said tube means, a load resistor for and in the output of said tube means, and meter means coupled with said tube means through said load resistor and said wave symmetry improving capacitor means and indicating the magnitude and the polarity of the magnetic field into which the magnetometer is positioned.

2. A meter circuit for use with a magnetometer having an output, comprising a first transformer to which the magnetometer output is applied, means rectifying and smoothing the first transformer output to provide a series of loops of single polarity, a pair of cathode follower tubes to the grid of one of which said series of loops is applied as input and having cathodes and plates, a discriminator second transformer to opposite windings of which the cathodes of said cathode follower tubes are connected, a meter indicating the magnitude and the polarity of a magnetic field around the magnetometer, and a filter system interposed between said meter and said second transformer and a plate of one of said cathode follower tubes for supplying input to said meter.

3. A meter circuit for use with a vertical magnetometer having a pair of coils and an output, comprising a magnetometer containing coils, oscillator means supplying electrical pulses to said magnetometer, a meter circuit containing a meter, means rectifying and smoothing the magnetometer output to provide a series of loops of a single polarity, cathode follower means to which the series of loops of a single polarity is applied, discriminator transformer means connected across the cathode circuit of said cathode follower means and having an output, discriminator duo-diode means having a plate and a cathode across which the output from said transformer means is impressed and having an output applied as a negative feedback to the magnetometer coils in a direction to oppose the change in flux producing an unbalanced wave form to generate a current at said transformer output and stabilize the magnetometer, a pair of triode means with plates and grids as parts thereof in said meter circuit, resistor means connecting said triode plates, means connecting the grid of the first of said triode means with the output of said transformer means, means connecting the second triode means grid with said duo-diode means output, and a meter connected across a fractional part of said resistor means connecting said triode plates.

4. A meter circuit for use with a vertical magnetometer having a pair of coils and an output, comprising a resistor across one of said magnetometer coils, means supplying potential to said magnetometer coils, a meter as a part of the meter circuit, means rectifying and smoothing the magnetometer output to provide a series of loops of a single polarity and of an amplitude influenced by a magnetic field strength around said magnetometer, cathode follower means to which the series of loops is applied, discriminator transformer means receiving the output from said cathode follower means and having an output, a discriminator duo-diode means receiving the transformer means output and having an output applied in part as negative feedback to the magnetometer coils as a stabilizing factor therefor, a pair of meter triode tubes having plates and having grids across which a part of the output of said duo-diode means is applied removably, power supplied resistor means connecting the plates of and supplying plate potential to said meter triode tubes, and meter calibrating means connected in series with said meter across a portion of the resistor means connecting the plates of said pair of meter triode tubes and said meter, when calibrated, indicating the magnitude and polarity of a magnetic field in which the magnetometer coils may be positioned.

5. A meter circuit for use with a vertical magnetometer having a pair of coils and an output, comprising a resistor across one of said magnetometer coils, a meter circuit having a meter as a part thereof, means rectifying and smoothing the magnetometer output to provide a series of loops of a single polarity and of an amplitude influenced by magnetic field strength around said magnetometer, cathode follower means to which the series of loops is applied and having an output, discriminator transformer means to which the cathode follower means output is applied and having an output, a discriminator duo-diode means receiving the transformer means output and having an output applied in part as negative feedback to the magnetometer coils, a pair of meter triode tubes having plates and having grids across which a part of the duo-diode means output is applied, power supplied resistor means connecting the plates of and supplying plate potential to said pair of meter triode tubes, meter calibrating means connected in series with said meter across a fraction of the resistive means connecting the meter triode tube plates, filter system means positioned between the grids and plates of said meter triode tubes for modifying the rate of response thereof, and voltage limiting means in the circuit of said meter triode tubes to restrain the deflection magnitude of said meter means.

6. A circuit for use with a vertical magnetometer having a pair of cored windings to which an alternating voltage is supplied and having an output indicative of the polarity and the magnitude of a magnetic field in which the magnetometer may be positioned, comprising means rectifying and smoothing signal output from the magnetometer to provide a series of loops of a single polarity, a load resistor across which the series of loops of a single polarity is developed, a first cathode folower tube having a plate resistively connected to a source of positive potential and a grid connected through a coupling capacitor to the signal rectifying and smoothing means, a second cathode follower tube having a plate connected to a source of positive potential and a grid capacitively coupled to an alternating voltage from which the voltage supplied to the magnetometer is derived, a discriminator transformer having its primary winding connected between the cathode of said cathode follower tube and a point of low signal potential and a mid-point of its secondary winding capacitively and resistively coupled to the cathode of said second cathode follower tube, a duo-diode tube upon which the output from said transformer is impressed, and meter means indicating the polarity and magnitude of the magnetic field in which the magnetometer is disposed and receiving its input from said duo-diode tube.

7. A meter circuit for use with a vertical magnetometer having a pair of windings to which an alternating current is applied and having an output indicative of the polarity and magnitude of a magnetic field in which the magnetometer may be positioned, comprising a magnetometer having an output, a meter circuit inductively coupled with the magnetometer output, means rectifying and smoothing the output from the magnetometer to provide an input to the meter circuit, a first cathode follower tube having a plate resistively connected to a source of positive potential and having a grid capacitively coupled to said means for rectifying and smoothing the output from the magnetometer to provide an input to the meter circuit and having a cathode, a second cathode follower tube deriving its grid input from the alternating current source to the magnetometer and having a cathode, a discriminator transformer across the primary and secondary windings of which the cathodes of the cathode follower tubes are connected for the inductive transfer of the rectified smoothed magnetometer output therebetween, and a meter resistively coupled to said transformer and indicating the polarity and magnitude of the magnetic field in which the magnetometer is positioned.

8. A megnetic field detecting device, comprising an oscillator, a magnetometer deriving its input from said oscillator and providing magnetometer output voltage pulses, an inductance bridge of four legs across which the magnetometer pulses from said magnetometer are impressed, inductance cores in two of the legs of said inductance bridge, a phase shifting resistor shunting the inductance of one of said inductance cores for shifting the phase of the magnetometer pulses impressed thereacross, a first transformer to which alternate positive and negative voltage pulses which vary in amplitude with change in the ambient magnetic field of said inductance bridge are passed from said inductance bridge, a duplex diode triode first vacuum tube receiving alternate positive and negative pulses from said first transformer and passing wave forms of a single polarity, a wave shaping circuit receiving pulses from said first transformer and supplying pulses of a single polarity to a grid of the triode part of said first vacuum tube, a discriminator, a second transformer in said discriminator, a cathode follower second vacuum tube connected between the positive potential supply for said first vacuum tube and the discriminator transformer and having a grid to which the pulses from said first tube are applied and for discriminating between flux changes in the ambient field in which said inductance cores may be positioned, a cathode follower third vacuum tube connected between the positive potential supply for said first vacuum tube and the discriminator transformer and having a grid to which the output from said oscillator is inductively coupled, and means coupled with the output from said discriminator for indicating the magnitude and polarity of changes in the ambient magnetic field about said magnetometer.

9. A magnetic field detecting device, comprising a pair of high permeability cores in a pair of inductive windings as two legs of an inductive bridge, a phase shifting resistor shunting one of said pair of inductive windings, an oscillator supplying an alternating voltage to the inductive bridge, a regulated voltage supply supplying potential to said oscillator, a discriminator to which potential is supplied from said regulated voltage supply, means smoothing and making of a single polarity the output from the high permeability cores upon being passed through said discriminator, and a meter circuit receiving its input from said discriminator and indicating changes in the ambient field of said pair of high permeability cores.

10. A magnetic field detecting device, comprising an inductance bridge containing a pair of series connected inductance cores and to which bridge an alternating current is applied, a phase shifting resistor shunting one of said inductance cores for shifting the phase of the induced voltage to produce alternate positive and negative pulses, a first transformer means receiving the alternating current output from the inductance bridge and having a center tapped secondary winding, a duplex diode triode first vacuum tube coupled with and receiving the alternating current output from said first transformer means, a transformer oscillation damping resistor shunting the secondary winding of said first transformer, a plurality of resistor and capacitor wave shaping elements conducting output from the center tap on the secondary winding of said first transformer to said vacuum tube, a load resistor through which positive plate potential is supplied to said first vacuum tube, a cathode follower second tube having a resistively biased grid capacitively coupled with the output of said first vacuum tube and a plate and a resistively biased cathode, a second tube plate resistor through which positive plate potential is applied, a discriminator transformer having a primary winding connected between the junction of the grid and cathode biasing resistors of said second tube and ground and having a center tapped secondary winding, a cathode follower third tube having a plate receiving positive plate potential and having grid and cathode electrodes resistively connected together and capacitively coupled with the center tap on the secondary winding of said discriminator transformer and said third tube grid receiving alternating current from the source supplying said inductance bridge, and meter means indicating the magnitude and polarity of voltage change in said inductance cores from the output from the secondary winding of said discriminator transformer.

References Cited in the file of this patent

UNITED STATES PATENTS

| | | |
|---|---|---|
| 2,406,870 | Vacquier | Sept. 3, 1946 |
| 2,418,553 | Irwin | Apr. 8, 1947 |

FOREIGN PATENTS

| | | |
|---|---|---|
| 515,158 | Great Britain | Nov. 28, 1939 |